(12) United States Patent
Acuna et al.

(10) Patent No.: US 9,208,294 B2
(45) Date of Patent: Dec. 8, 2015

(54) MANAGING LICENSE KEYS

(71) Applicant: International Business Machines Corporation, Armonk, NY (US)

(72) Inventors: Jorge D Acuna, Vail, AZ (US); Linda V. Benhase, Tucson, AZ (US); John D. Lauer, Tucson, AZ (US); Duikaruna C. Soepangkat, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 13/776,401

(22) Filed: Feb. 25, 2013

(65) Prior Publication Data

US 2013/0174269 A1    Jul. 4, 2013

Related U.S. Application Data

(63) Continuation of application No. 11/764,101, filed on Jun. 15, 2007, now Pat. No. 8,387,149.

(30) Foreign Application Priority Data

May 21, 2008    (WO) ................ PCT/EP2008/056287

(51) Int. Cl.
    *H04L 29/06*     (2006.01)
    *G06F 21/10*     (2013.01)
    *H04L 9/08*      (2006.01)

(52) U.S. Cl.
    CPC .............. *G06F 21/105* (2013.01); *H04L 9/088* (2013.01); *H04L 63/062* (2013.01)

(58) Field of Classification Search
    CPC ...... H04L 63/062; H04L 9/088; G06F 21/105
    See application file for complete search history.

(56) References Cited

U.S. PATENT DOCUMENTS

| 6,662,284 B2 | 12/2003 | Gold |
| 2002/0091809 A1 | 7/2002 | Menzies et al. |
| 2002/0099787 A1 | 7/2002 | Bonner et al. |

(Continued)

FOREIGN PATENT DOCUMENTS

EP    1624407    2/2006

OTHER PUBLICATIONS

John Crandall et al., SNIA Storage Management Initiative Specification v 1.0.1, Storage Networking Industry Association, 2003, pp. 481-484, XP002516595, San Francisco, retrieved from Internet http://xml.coverpages.org/SNIA-SMISv101.pdf.

(Continued)

*Primary Examiner* — Jeffrey Pwu
*Assistant Examiner* — Thong Truong
(74) *Attorney, Agent, or Firm* — Kunzler Law Group

(57) ABSTRACT

For managing license keys, a license key service module creates a license key service object of a license key service class. The license key service object includes a plurality of management operations including a get all license keys operation that acquires a license key for licensing services. A hosted license key service module creates a hosted license key service object of a hosted license key service class that includes the license key service object. A license key module creates a license key object of a license key class. The license key object includes the license key and employs the plurality of management operations. A management module manages the license key using the license key object, license key service object, and hosted license key service object.

30 Claims, 8 Drawing Sheets

(56) References Cited

U.S. PATENT DOCUMENTS

| | | |
|---|---|---|
| 2002/0188704 A1 | 12/2002 | Gold et al. |
| 2005/0049886 A1 | 3/2005 | Grannan et al. |
| 2005/0049976 A1 | 3/2005 | Yang |
| 2006/0031172 A1 | 2/2006 | Otsuka |
| 2006/0112019 A1* | 5/2006 | Roberts, Jr. .................... 705/59 |
| 2006/0287961 A1 | 12/2006 | Mori et al. |
| 2007/0233782 A1* | 10/2007 | Tali ............................... 709/203 |
| 2008/0222603 A1* | 9/2008 | Shaw et al. .................... 717/120 |

OTHER PUBLICATIONS

PCT/EP2008/056287, International Search Report and Written Opinion, Mar. 5, 2009.

* cited by examiner

MANAGING LICENSE KEYS

CROSS-REFERENCE TO RELATED APPLICATIONS

This application is a continuation application of and claims priority to U.S. patent application Ser. No. 11/764,101 entitled "APPARATUS, SYSTEM, AND METHOD FOR MANAGING LICENSE KEYS" filed on Jun. 15, 2007 for Jorge D. Acuna, which is incorporated herein by reference.

BACKGROUND

1. Field

This invention relates to license keys and more particularly relates to managing license keys.

2. Description of the Related Art

Data processing systems often use license keys to limit access to software and/or data to authorized users. For example, a data processing system may only allow a user with a specified license key to access a data store. Alternatively, the data processing system may only allow a user with a specified license key to use a software application.

A license key may be number of a specified length. The license key may be employed by a mathematical algorithm to decrypt encrypted data. Alternately, the license key may be a public key of a public/private key pair. The public license key may encrypt a message that is decrypted by the private key.

Data processing systems are often heterogeneous environments, with hardware components and software from many vendors working together. As a result, standards have been developed to coordinate interoperability between hardware and software components from different vendors.

For example, the Storage Networking Industry Association's Storage Management Initiative (SMI) was created to develop and standardize interoperable storage management technologies for the storage, networking and end user communities. The Storage Networking Industry Association published a SMI specification (SMI-S) that includes a Common Information Model (CIM). The CIM defines software classes that can be used to create objects that facilitate communications between disparate hardware and software components.

Unfortunately, SMI-S CIM does not include classes for objects that manage license keys. As a result, vendors often must employ ad hoc solutions to manage license keys in data processing systems.

SUMMARY

From the foregoing discussion, there is a need for an apparatus, system, and method that manage license keys. Beneficially, such an apparatus, system, and method would support managing license keys in a heterogeneous environment.

The present invention has been developed in response to the present state of the art, and in particular, in response to the problems and needs in the art that have not yet been fully solved by currently available license key management methods. Accordingly, the present invention has been developed to provide an apparatus, system, and method for managing license keys that overcome many or all of the above-discussed shortcomings in the art.

The apparatus to manage license keys is provided with a plurality of modules configured to functionally execute the steps of creating a license key service object, creating a hosted license key service object, creating a license key object, and managing a license key. These modules in the described embodiments include a license key service module, a hosted license key service module, a license key module, and a management module.

The license key service module creates a license key service object of a license key service class. The license key service class extends a SMI-S CIM CIM_Service class. The license key service object comprises a plurality of management operations.

The hosted license key service module creates a hosted license key service object of a hosted license key service class. The hosted license key service object comprises the license key service object and is an object of a SMI-S CIM CIM_ComputerSystem object.

The license key module creates a license key object of a license key class. The license key class extends a SMI-S CIM CIM_ManagedElement class. The license key object comprises a license key and employs the plurality of management operations. The management module manages the license key using the license key object, license key service object, and hosted license key service object. The apparatus manages license keys using objects of extended SMI-S CMI classes.

A system of the present invention is also presented to manage license keys. The system may be embodied in a data processing system. In particular, the system, in one embodiment, includes a storage system and a computer.

The storage system stores data. The computer is in communication with the storage system. The computer includes a license key service module, a hosted license key service module, a license key module, and a management module. The license key service module creates a license key service object of a license key service class. The license key service class extends a SMI-S CIM CIM_Service class. The license key service object comprises a plurality of management operations.

The hosted license key service module creates a hosted license key service object of a hosted license key service class. The hosted license key service object comprises the license key service object and is an object of a SMI-S CIM CIM_ComputerSystem object.

The license key module creates a license key object of a license key class. The license key class extends a SMI-S CIM CIM_ManagedElement class. The license key object comprises a license key and employs the plurality of management operations. The management module manages the license key using the license key object, license key service object, and hosted license key service object. The system manages license keys for the storage system using objects of extended SMI-S CMI classes.

A method of the present invention is also presented for managing license keys. The method in the disclosed embodiments substantially includes the steps to carry out the functions presented above with respect to the operation of the described apparatus and system. In one embodiment, the method includes creating a license key service object, creating a hosted license key service object, creating a license key object, and managing a license key.

A license key service module creates a license key service object of a license key service class. The license key service class extends a SMI-S CIM CIM_Service class. The license key service object comprises a plurality of management operations.

A hosted license key service module creates a hosted license key service object of a hosted license key service class. The hosted license key service object comprises the license key service object and is an object of a SMI-S CIM CIM_ComputerSystem object.

A license key module creates a license key object of a license key class. The license key class extends a SMI-S CIM CIM_ManagedElement class. The license key object comprises a license key and employs the plurality of management operations. A management module manages the license key using the license key object, license key service object, and hosted license key service object. The method manages license keys for a storage system using objects of extended SMI-S CMI classes.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention creates objects for managing license keys. The objects are of classes that extend SMI-S CIM classes. The present invention manages license keys using the objects. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays (FPGAs), programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within the modules, and may be embodied in any suitable form and organized within any suitable type of data structure. The operational data may be collected as a single data set, or may be distributed over different locations including different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
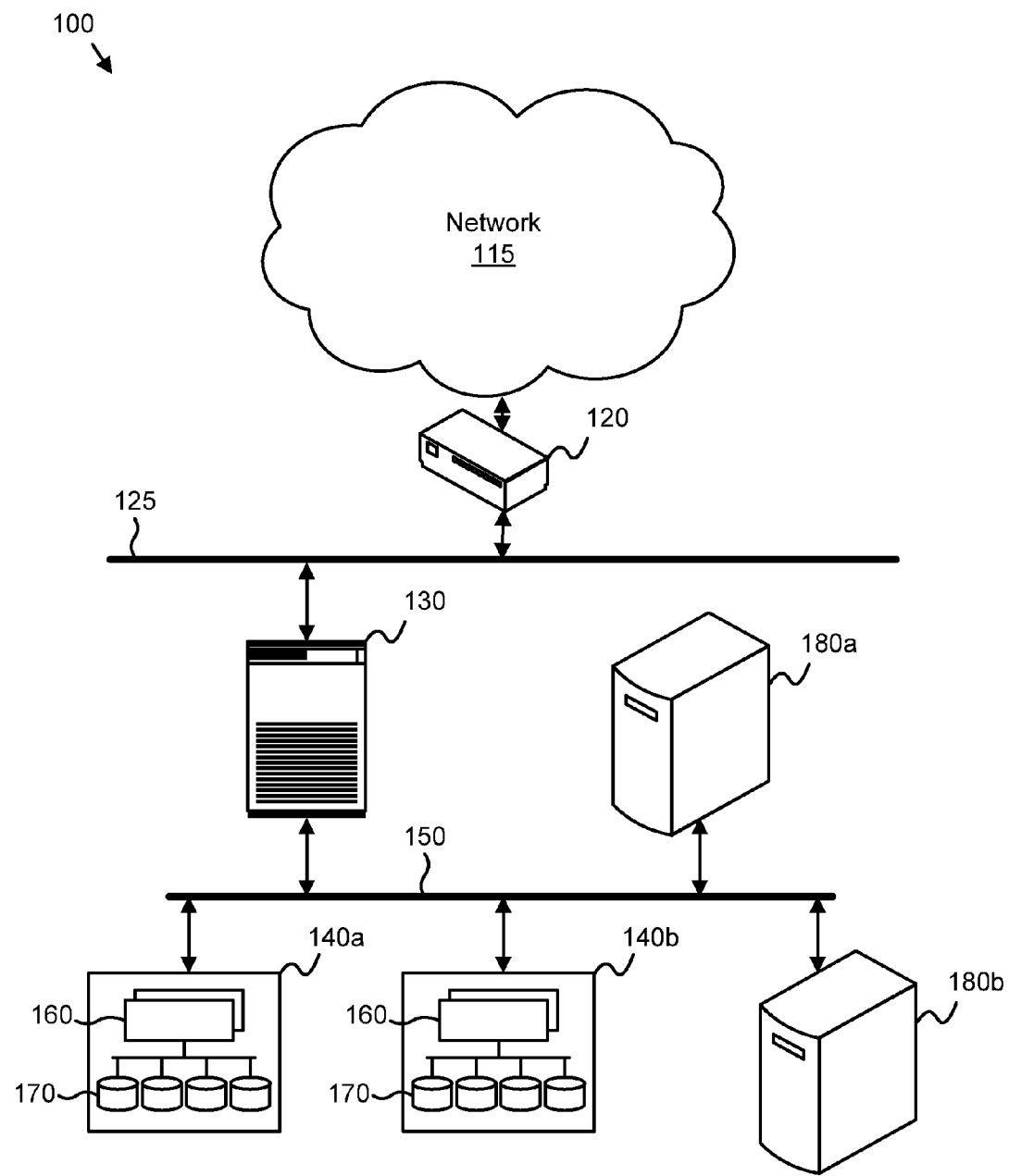
FIG. 1 is a schematic block diagram illustrating one embodiment of a data processing system in accordance with the present invention.

FIG. 1 is a schematic block diagram illustrating one embodiment of a data processing system 100 in accordance with the present invention. The system 100 includes a network 115, a router 120, an internal network 125, a server 130, a storage communications channel 150, one or more storage subsystems 140, and one or more tape drives 180.

The server 130 may be configured as a mainframe computer, a blade center comprising multiple blade servers, and the like. Although for simplicity one network 115, one router 120, one internal network 125, one server 130, one storage communications channel 150, two storage subsystems 140, and two tape drives 180 are shown, any number of networks 115, routers 120, internal networks 125, servers 130, storage communications channels 150, storage subsystems 140, and tape drives 180 may be employed. One of skill in the art will also readily recognize that the data processing system 100 could include other data processing devices such as bridges, scanners, printers, and the like.

Each storage subsystem 140 includes one or more storage controllers 160 and one or more storage devices 170. The storage devices 170 may be hard disk drives, optical storage devices, magnetic tape drives, micromechanical storage devices, holographic storage devices, and semiconductor storage devices.

In one embodiment, the system 100 provides data storage services. For example, a client may access data stored on a storage device 170 of a storage subsystem 140 by communicating a request through the network 115, the router 120, the internal network 125, the server 130, and the storage communications channel 150 to a storage controller 160 for the storage device 170. The storage controller 160 may retrieve the data from the storage device 170 and communicate the data to the client 110.

The server 130, storage subsystems 140, and tape drivers may be from a plurality of vendors. As a result the system 100 may employ SMI-S CIM classes for objects that facilitate communicates between elements.

The system 100 may employ one or more license keys. For example, a license key may be required to access a software application stored on the server 130. The present invention manages license keys for the system 100 as will be described hereafter.

Figure 2:
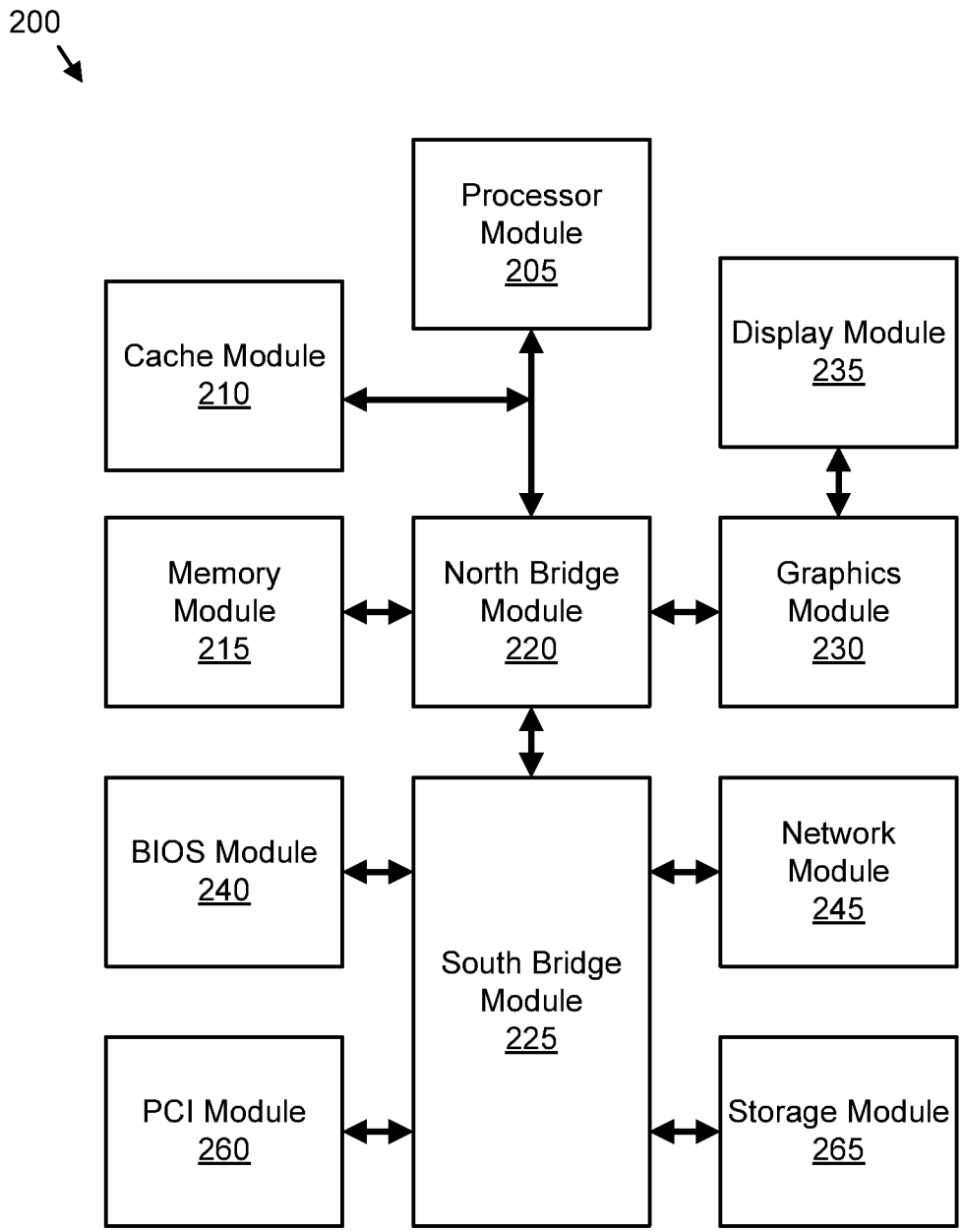
FIG. 2 is a schematic block diagram illustrating one embodiment of a computer of the present invention.

FIG. 2 is a schematic block diagram illustrating one embodiment of a computer 200 of the present invention. The computer 200 includes a processor module 205, a cache module 210, a memory module 215, a north bridge module 220, a south bridge module 225, a graphics module 230, a display module 235, a basic input/output system ("BIOS") module 240, a network module 245, a peripheral component interconnect ("PCI") module 260, and a storage module 265. The computer 200 may be the server 130 of FIG. 1. Alternatively, the computer 200 may be in communication with the system 100 of FIG. 1 through the network 115.

The processor module 205, cache module 210, memory module 215, north bridge module 220, south bridge module 225, graphics module 230, display module 235, BIOS module 240, network module 245, PCI module 260, and storage module 265, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory module 215 stores software instructions and data. The processor module 205 executes the software instructions and manipulates the data as is well know to those skilled in the art. The software instructions and data may be configured as one or more computer readable programs. The computer readable programs may be tangibly stored in the storage module 265. The storage module 265 may be a hard disk drive, an optical storage device, a holographic storage device, a micromechanical storage device, a semiconductor storage device, or the like.

Figure 3:
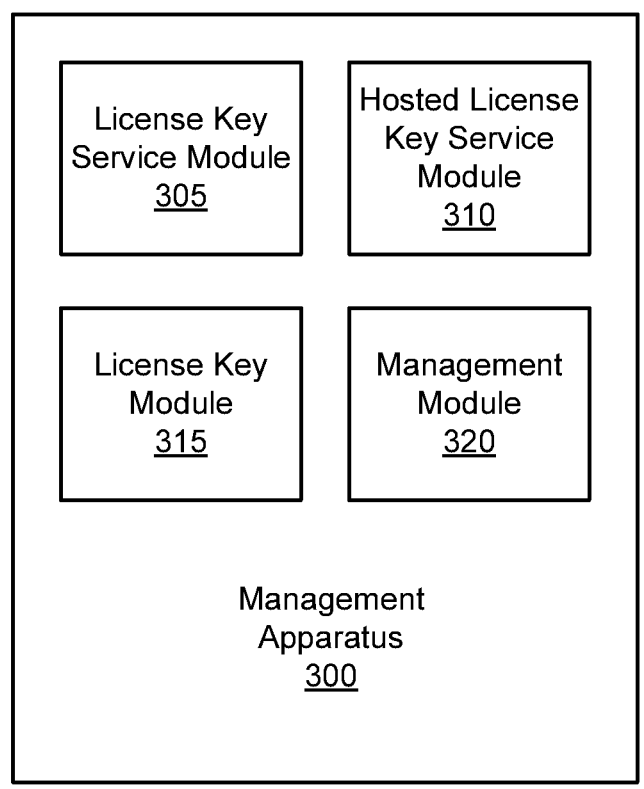
FIG. 3 is a schematic block diagram illustrating one embodiment of a management apparatus of the present invention.

FIG. 3 is a schematic block diagram illustrating one embodiment of a management apparatus 300 of the present invention. The computer 200 of FIG. 2 may embody the apparatus 300. The description of the apparatus 300 refers to elements of FIGS. 1-2, like numbers referring to like elements. The apparatus 300 includes a license key service module 305, a hosted license key service module 310, a license key module 315, and a management module 320.

The license key service module 305 creates a license key service object of a license key service class. The license key service class extends a SMI-S CIM CIM_Service class. The license key service object comprises a plurality of management operations.

The hosted license key service module 310 creates a hosted license key service object of a hosted license key service class. The hosted license key service object comprises the license key service object and is an object of a SMI-S CIM CIM_ComputerSystem object.

The license key module 315 creates a license key object of a license key class. The license key class extends a SMI-S CIM CIM_ManagedElement class. The license key object comprises a license key and employs the plurality of management operations.

The management module 320 manages the license key using the license key object, the license key service object, and the hosted license key service object. For example, each license key of the system 100 may be stored in a separate license key object. The management module 320 may manage the license key objects using the license key service objects and host license key service objects as will be described hereafter.

Figure 4:
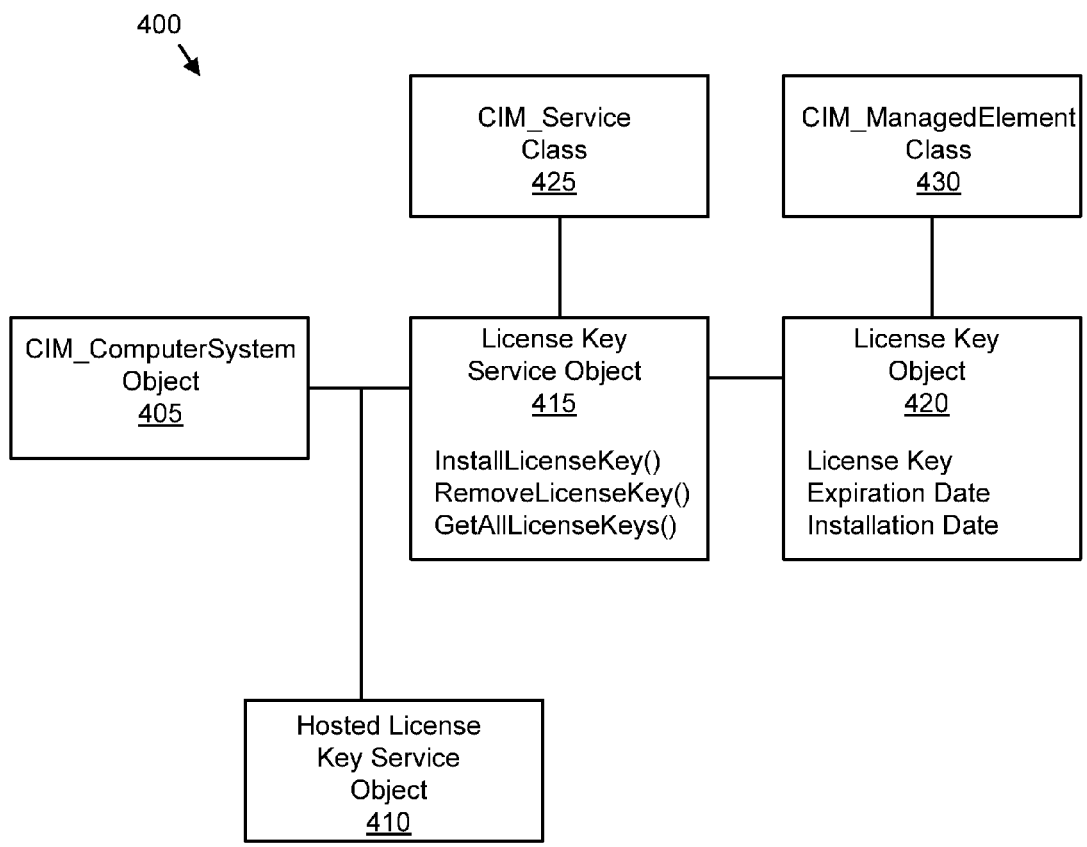
FIG. 4 is a schematic block diagram illustrating one embodiment of license objects of the present invention.

FIG. 4 is a schematic block diagram illustrating one embodiment of license objects 400 of the present invention. The management module 320 employs the objects 400 to manage license keys. The description of the objects 400 refers to elements of FIGS. 1-3, like numbers referring to like elements.

The license key object 420 is created from the license key class that extends the SMI-S CIM CIM_ManagedElement class 430. For example, the license key object 420 may import the CIM_ManagedElement class 420 as illustrated by initial lines of source code for creating the license key object 420 in Table 1.

TABLE 1 import CIM_ManagedElement.class.*;
class licensekey {

Thus the license key object 420 may include all of the elements of the CIM_ManagedElement class 430. The license key object includes a license key, an expiration date, and an installation date. The license key, expiration date, and installation date may be stored as values in data fields of the memory module 215 and/or storage module 265. The license key may be a number with a fixed length such as a one hundred and twenty (120) digit number. The expiration date and installation date may be date/time codes. The installation date may specify a date when the license key was installed. The expiration date may specify a date when the license key expires.

The license key service object 415 is created from the license key service class. The license key service class extends the SMI-S CIM CIM_Service class 425. For example, the license key service object may import the CIM CIM_Service class 425 as illustrated by initial lines of source code for creating the license key service object 415 in Table 2.

TABLE 2

```
import CIM_Service.class.*;
class licensekeyservice {
```

The license key service object 415 includes a plurality of management operations. In the depicted embodiment, the license key service object 415 includes an "InstallLicenseKey( )" or install license key operation, a "RemoveLicenseKey( )" or remove license key operation, and a "GetAllLicenseKeys( )" or get all license keys operation.

The CIM_ComputerSystem object 405 is created from a SMI-S CIM CIM_ComputerSystem class as is well known to those of skill in the art. The hosted license key service object 410 is created from a hosted license key service class. The hosted license key service object 410 creates an association between the CIM_ComputerSystem object 405 and the license key service object 415. The management module 320 may offer licensed services through the SMI-S CIM CIM_ComputerSystem object 405 using the hosted license key service object 410.

In one embodiment, the license key class, license key service class, and hosted license key service class are defined using a CIM Managed Object Format (MOF) language. MOF may be based on an Interface Definition Language (IDL). MOF may define object definitions in textual form, establishing a syntax for writing definitions.

The install license key operation may copy the license key to the license key object 420 and write a time stamp as the installation date to the license key object 420. In one embodiment, the remove license key operation deletes the license key object 420. For example, the remove license key operation may delete the license key object 420 by removing an index to the license key object 420 in the memory module 215. The get all license keys operation may acquire the license key from a service in response to a request. For example, an application program may request a license keys in order to operate. The management module 320 may employ to the get all license keys operation to retrieve the license keys from the service that provides license keys in response to the request.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
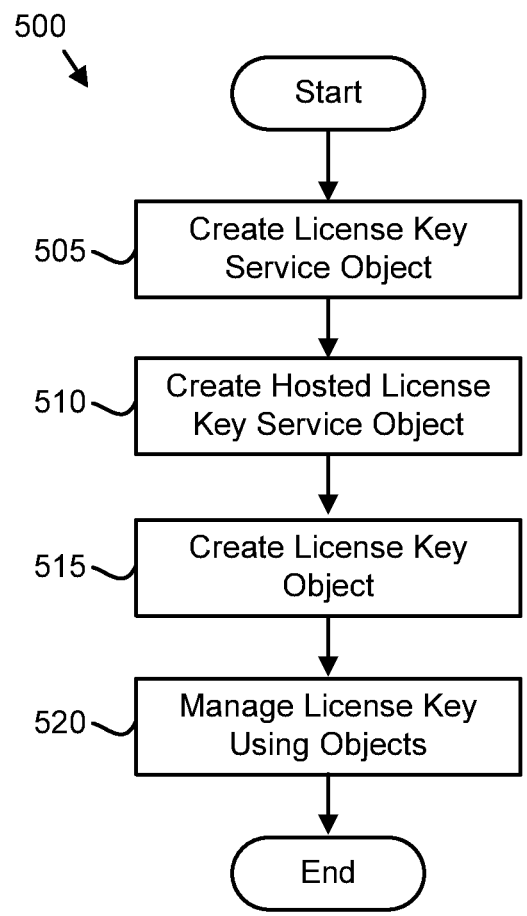
FIG. 5 is a schematic flow chart diagram illustrating one embodiment of a license key management method of the present invention.

FIG. 5 is a schematic flow chart diagram illustrating one embodiment of a license key management method 500 of the present invention. The method 500 substantially includes the steps to carry out the functions presented above with respect to the operation of the described system, apparatus, and objects of FIGS. 1-4. In one embodiment, the method 500 is implemented with a computer program product comprising a computer readable medium having a computer readable program. The computer readable program may be integrated into a computing system, such as the computer 200, wherein the program in combination with the computing system is capable of performing the method 500.

The method 505 starts and the license key service module 305 creates 505 the license key service object 415 of the license key service class. In one embodiment, the license key service module 305 creates 505 the license key service object 415 by allocating a specified portion of memory in the memory module 215 and/or the storage module 265 for the license key service object 415. The license key service module 305 may further create a license key service pointer to the specified portion of memory and communicate the license key service pointer to one or more computer readable programs. The license key service class extends the SMI-S CIM CIM_Service class 425. The license key service object 415 includes a plurality of management operations.

The hosted license key service module 310 creates 510 a hosted license key service object 410 of a hosted license key service class. In one embodiment, the hosted license key service module 310 creates 510 the hosted license key service object 410 by allocating a specified portion of memory in the memory module 215 and/or the storage module 265 for the hosted license key service object 410. The hosted license key service module 310 may further create a hosted license key service pointer to the specified portion of memory and communicate the hosted license key service pointer to one or more computer readable programs. The hosted license key service object 410 comprises the license key service object and is an object of a SMI-S CIM CIM_ComputerSystem object.

The license key module 315 creates 515 the license key object 420 of a license key class. In one embodiment, the license key module 315 creates 515 the license key object 420 by allocating a specified portion of memory in the memory module 215 and/or the storage module 265 for the license key object 420. The license key module 315 may further create a license key pointer to the specified portion of memory and communicate the license key pointer to one or more computer readable programs. The license key class extends the SMI-S CIM CIM_ManagedElement class 430. The license key object 420 includes a license key and employs the plurality of management operations.

The management module 320 manages 520 the license key using the license key object 420, the license key service object 415, and the hosted license key service object 410 as will be described hereafter in FIGS. 6-8, and the method 500 ends. The method 500 manages 520 license keys for a storage system 100 using the objects 400, allowing the management of license keys under SMI-S. The present invention supports and extends CIM so that license keys may be consistently managed in heterogeneous systems 100.

Figure 6:
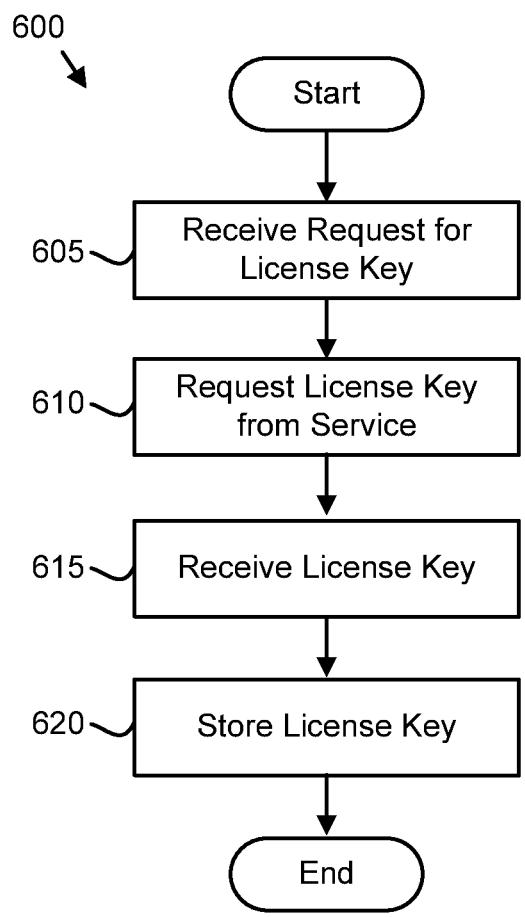
FIG. 6 is a schematic flow chart diagram illustrating one embodiment of a license key storage method of the present invention.

FIG. 6 is a schematic flow chart diagram illustrating one embodiment of a license key storage method 600 of the present invention. The method 600 substantially includes the steps to carry out the functions presented above with respect to the operation of the described system, apparatus, and objects of FIGS. 1-4 and step 520 of FIG. 5. In one embodiment, the method 600 is implemented with a computer program product comprising a computer readable medium having a computer readable program. The computer readable program may be integrated into a computing system, such as the computer 200, wherein the program in combination with the computing system is capable of performing the method 600.

The method 600 starts and in one embodiment, the management module 320 receives 605 a request for a license key.

The request may be from a user wishing to use a proprietary software application, an application wishing to access a database, or the like.

The management module 320 may request 610 the license key from a service. The service may be a computer readable program executed by a server 130 that grants licenses and that debits an account for a requesting entity. The service may communicate a license key to the management module 320.

The management module 320 may receive 615 the license key. For example, the management module 320 may employ the license key service object 415 to retrieve the license key from the service using the get all license keys operation. In one embodiment, the management module 320 stores 620 the license key as will be described hereafter and the method 600 ends. The method 600 stores 620 the license key, managing the acquisition of the license key.

Figure 7:
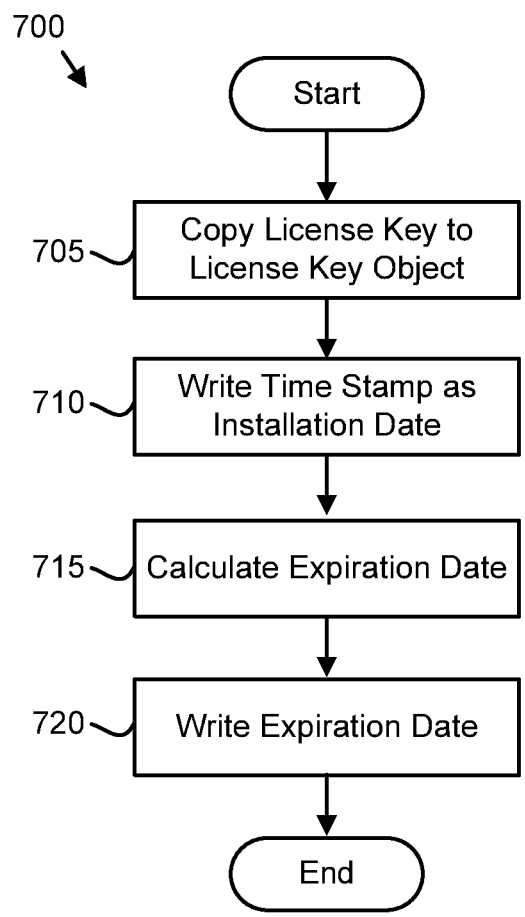
FIG. 7 is a schematic flow chart diagram illustrating one embodiment of a license key object creation method of the present invention.

FIG. 7 is a schematic flow chart diagram illustrating one embodiment of a license key object creation method 700 of the present invention. The method 700 substantially includes the steps to carry out the functions presented above with respect to the operation of the described system, apparatus, and objects of FIGS. 1-4 and step 620 of FIG. 6. In one embodiment, the method 700 is implemented with a computer program product comprising a computer readable medium having a computer readable program. The computer readable program may be integrated into a computing system, such as the computer 200, wherein the program in combination with the computing system is capable of performing the method 700.

The method 700 starts and in one embodiment, the management module 320 copies 705 the license key to the license key object 420. For example, the management module 320 may employ the license key service object install license key operation to copy 705 the license key to a data field in the memory module 215 of the license key object 420.

The management module 320 may further write 710 a time stamp as the installation date using the install license key operation. The time stamp may be a time that the license key is copied 705 to the license key object 420. Alternatively, the time stamp may be a time that the license key is retrieved from the service. The management module 320 may employ the license key service object install license key operation to write 710 the time stamp.

In one embodiment, the management module 320 calculates 715 the expiration date. The expiration date may be the installation date plus a specified time interval. In one embodiment, the management module 320 receives the specified time interval from the service.

The management module 320 may further write 720 the expiration date to the license key object 420 and the method 700 ends. In one embodiment, the management module 320 writes the expiration data to a data field in the memory module 215 of the license key object 420. The method 700 stores 620 the license key for use within the system 100.

Figure 8:
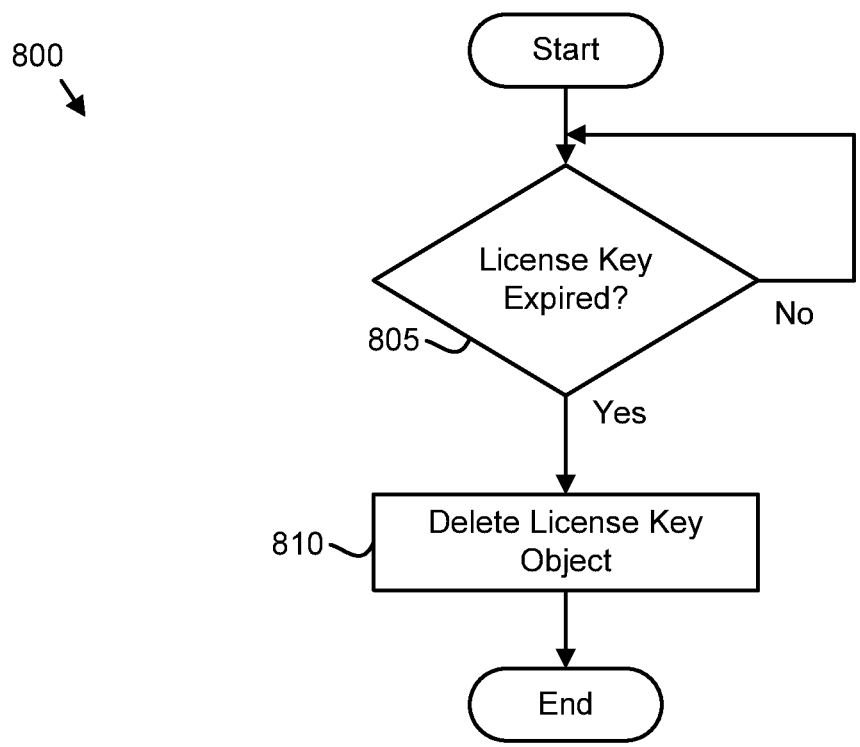
FIG. 8 is a schematic flow chart diagram illustrating one embodiment of a license key removal method of the present invention.

FIG. 8 is a schematic flow chart diagram illustrating one embodiment of a license key removal method 800 of the present invention. The method 800 substantially includes the steps to carry out the functions presented above with respect to the operation of the described system, apparatus, and objects of FIGS. 1-4 and step 520 of FIG. 5. In one embodiment, the method 800 is implemented with a computer program product comprising a computer readable medium having a computer readable program. The computer readable program may be integrated into a computing system, such as the computer 200, wherein the program in combination with the computing system is capable of performing the method 800.

The method 800 starts, and in one embodiment, the management module 320 determines 805 if the license key stored in the license key object 420 is expired. The management module 320 may determine 805 that the license key is expired if the expiration date stored in the license key object 420 exceeds a current date. If the management module 320 determines 805 that the license key is not expired, the management module 320 may check the expiration of the license key at a later time.

If the license key is expired, the management module 320 may delete 810 the license key object so that the license key may no longer be used within the system 100. The method 800 manages 520 the license key by deleting 810 expired license key objects 420.

The present invention creates objects 400 for managing license keys. The objects 400 are of classes that extend SMI-S CIM classes. The present invention manages 520 license keys using the objects 400. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a computer useable storage medium storing a computer readable program executable by a processor, the computer readable program comprising:
a license key service module creating a license key service object of a license key service class, wherein the license key service object comprises a plurality of management operations comprising a get all license keys operation that acquires a license key for licensing services and an install license key operation that writes a time stamp of a time the license key is retrieved from a service as an installation date to the license key object, calculates an expiration date as the installation date plus a specified time interval from the service, and writes the expiration date to the license key object;
a hosted license key service module creating a hosted license key service object of a hosted license key service class that comprises the license key service object;
a license key module creating a license key object of a license key class, wherein the license key object comprises the license key and employs the plurality of management operations; and
a management module managing the license key using the license key object, license key service object, and hosted license key service object.

2. The apparatus of claim 1, wherein the license key object comprises the installation date that specifies a date when the license key was installed.

3. The apparatus of claim 1, wherein the license key object comprises the expiration date that specifies a date when the license key expires.

4. The apparatus of claim 3, wherein the management module calculates the expiration date.

5. The apparatus of claim 1, wherein the plurality of management operations comprise a remove license key operation that deletes the license key object.

6. The apparatus of claim 1, wherein the get all license keys operation acquires the license key from a service in response to a request.

7. A computer program product comprising a computer readable storage medium having program code embodied therein, the program code readable/executable by a processor to:
- create a license key service object of a license key service class, wherein the license key service object comprises a plurality of management operations comprising a get all license keys operation that acquires a license key for licensing services and an install license key operation that writes a time stamp, of a time the license key is retrieved from a service as an installation date to the license key object, calculates an expiration date as the installation date plus a specified time interval from the service, and writes the expiration date to the license key object;
- create a hosted license key service object of a hosted license key service class that comprises the license key service object;
- create a license key object of a license key class, wherein the license key object comprises the license key and employs the plurality of management operations; and
- manage the license key using the license key object, license key service object, and hosted license key service object.

8. The computer program product of claim 7, wherein the license key object comprises the installation date that specifies a date when the license key was installed.

9. The computer program product of claim 7, wherein the license key object comprises the expiration date that specifies a date when the license key expires.

10. The computer program product of claim 9, the computer readable program further causing the processor to calculate the expiration date.

11. The computer program product of claim 7, wherein the plurality of management operations comprises a remove license key operation that deletes the license key object.

12. The computer program product of claim 7, wherein the get all license keys operation that acquires the license key from a service in response to a request.

13. The computer program product of claim 7, wherein the license key class, the license key service class, and the hosted license key service class are defined using a Managed Object Format (MOF) language.

14. The computer program product of claim 7, the computer readable program further causing the processor to offer licensed services through a Storage Management Initiative specification (SMI-S) Common Information Model (CIM) CIM_ComputerSystem object using the hosted license key service object.

15. The computer program product of claim 7, the computer readable program further causing the processor to:
- receive a request for the license key;
- request the license key from a service;
- receive the license key; and
- store the license key in the license key object.

16. The computer program product of claim 15, the computer readable program further causing the computer to:
- copy the license key to the license key object;
- write a time stamp as an installation date to the license key object;
- calculate an expiration date; and
- write expiration date to the license key object.

17. A system to manage license keys, the system comprising:
- a storage system storing data;
- a computer in communication with the storage system and comprising:
  - a license key service module creating a license key service object of a license key service class, wherein the license key service object comprises a plurality of management operations comprising a get all license keys operation that acquires a license key for licensing services and an install license key operation that writes a time stamp of a time the license key is retrieved from a service as an installation date to the license key object, calculates an expiration date as the installation date plus a specified time interval from the service, and writes the expiration date to the license key object;
  - a hosted license key service module creating a hosted license key service object of a hosted license key service class that comprises the license key service object;
  - a license key module creating a license key object of a license key class, wherein the license key object comprises the license key and employs the plurality of management operations; and
  - a management module managing the license key using the license key object, license key service object, and hosted license key service object.

18. The system of claim 17, wherein the license key object comprises the installation date that specifies a date when the license key was installed.

19. The system of claim 17, wherein the license key object comprises the expiration date that specifies a date when the license key expires.

20. The system of claim 19, wherein the management module calculates the expiration date.

21. The system of claim 20, wherein the plurality of management operations comprises a remove license key operation that deletes the license key object.

22. The system of claim 21, wherein the get all license keys operation acquires the license key from a service in response to a request.

23. A method for deploying computer infrastructure, comprising integrating computer readable program into a computing system, wherein the program executed by the computing system performs the following:
- creating a license key service object of a license key service class, wherein the license key service object comprises a plurality of management operations comprising a get all license keys operation that acquires a license key for licensing services and an install license key operation that writes a time stamp of a time the license key is retrieved from a service as an installation date to the license key object, calculates an expiration date as the installation date plus a specified time interval from the service, and writes the expiration date to the license key object;
- creating a hosted license key service object of a hosted license key service class that comprises the license key service object;
- creating a license key object of a license key class, wherein the license key object comprises the license key and employs the plurality of management operations; and
- managing the license key using the license key object, license key service object, and hosted license key service object in a storage system environment.

24. The method of claim 23, wherein the license key object comprises the installation date that specifies a date when the license key was installed.

25. The method of claim 23, wherein the license key object comprises the expiration date that specifies a date when the license key expires.

26. The method of claim 25, the computer readable program further causing the computing system to calculate the expiration date.

27. The method of claim 23, wherein the plurality of management operations comprises a remove license key operation that deletes the license key object.

28. The method of claim 23, wherein the get all license keys operation acquires the license key from a service in response to a request.

29. The method of claim 23, wherein the license key class, license key service class, and hosted license key service class are defined using a MOF language.

30. The method of claim 23, wherein the method further comprises offering licensed services through a Storage Management Initiative specification (SMI-S) Common Information Model (CIM) CIM_ComputerSystem object using the hosted license key service object.

* * * * *